US012110044B2

(12) United States Patent
Kasap et al.

(10) Patent No.: US 12,110,044 B2
(45) Date of Patent: Oct. 8, 2024

(54) PASSENGER TRANSPORT VEHICLE

(71) Applicant: Siemens Mobility GmbH, Munich (DE)

(72) Inventors: Irfan Kasap, Herne (DE); Alexander Hildebrandt, Bochum (DE)

(73) Assignee: Siemens Mobility GmbH, Munich (DE)

( * ) Notice: Subject to any disclaimer, the term of this patent is extended or adjusted under 35 U.S.C. 154(b) by 211 days.

(21) Appl. No.: 17/910,889

(22) PCT Filed: Feb. 9, 2021

(86) PCT No.: PCT/EP2021/053089
§ 371 (c)(1),
(2) Date: Sep. 12, 2022

(87) PCT Pub. No.: WO2021/180406
PCT Pub. Date: Sep. 16, 2021

(65) Prior Publication Data

US 2023/0121571 A1 Apr. 20, 2023

(30) Foreign Application Priority Data

Mar. 12, 2020 (DE) ..................... 10 2020 203 198.3

(51) Int. Cl.
*B61D 27/00* (2006.01)
*B60H 1/00* (2006.01)

(52) U.S. Cl.
CPC ..... *B61D 27/0072* (2013.01); *B60H 1/00792* (2013.01); *B60H 1/00828* (2013.01)

(58) Field of Classification Search
CPC ............ B60H 1/00978; B60H 1/00792; B60H 1/00828; B60H 1/3225;
(Continued)

(56) References Cited

U.S. PATENT DOCUMENTS 9,827,827 B2 11/2017 Bidner et al.
2018/0117986 A1 5/2018 Kim et al.

FOREIGN PATENT DOCUMENTS

DE 102006006963 A1 8/2007
DE 202015101374 U1 8/2015
(Continued)

OTHER PUBLICATIONS

English language translation of WO2012/164619 to Gunjima et al. Translated May 2024 (Year: 2012).*

*Primary Examiner* — Cassey D Bauer
(74) *Attorney, Agent, or Firm* — Laurence A. Greenberg; Werner H. Stemer; Ralph E Locher

(57) ABSTRACT

A passenger transport vehicle contains an air conditioner which has a refrigerant circuit operated using a refrigerant. The refrigerant circuit has a condenser with a fan for conveying cooling air and an evaporator for controlling the temperature of supply air conveyed by a supply fan into a passenger compartment. Flow ducts for the cooling air and for the supply air are fluidically separated from one another inside the air conditioner by a partition wall. The partition wall has a degassing device being switched between a closed state for normal operation of the air conditioner and an open state for emergency operation of the air conditioner, in which emergency operation the degassing device fluidically connects the flow duct for the cooling air and the flow duct for the supply air to one another. A refrigerant detector is provided and when it detects the refrigerant, it triggers actuation of the degassing device.

8 Claims, 2 Drawing Sheets

(58) Field of Classification Search
CPC .. B61D 27/00–27/009; F25B 2500/222; F25B 2500/22
See application file for complete search history.

(56) References Cited

FOREIGN PATENT DOCUMENTS

| | | | | |
|---|---|---|---|---|
| EP | 0872693 | A2 | 10/1998 | |
| WO | WO-2012164619 | A1 * | 12/2012 | ......... B60H 1/00021 |

* cited by examiner 1
2
3
4
5
6
7
8
9
10
11
12
13
14
15
16
17
18
19
20
21
24
P1
P2
P3
P4

PASSENGER TRANSPORT VEHICLE

FIELD AND BACKGROUND OF THE INVENTION

The invention relates to a passenger transport vehicle according to the preamble of the independent claim.

Accordingly, a passenger transport vehicle is known which is equipped with an air conditioning unit which comprises a refrigeration circuit operated using a refrigerant, wherein the refrigeration circuit has a condenser with an associated condenser fan for conveying cooling air, and an evaporator, which belongs to an air treatment part of the air conditioning unit, for controlling the temperature of supply air which is conveyed by means of a supply air fan into a passenger compartment of the vehicle.

During operation of such a vehicle, it can happen that a leak occurs in the refrigeration circuit of the air conditioning unit, with the result that refrigerant can escape. In particular in the case of a leak in the immediate vicinity of the evaporator, escaping refrigerant would mix with the supply air present there and would pass further into the passenger compartment of the vehicle. For refrigerants that are not harmful to health, this is entirely acceptable.

However, it is also necessary to be able to use alternative refrigerants with an increased risk to human health, for example R290 (propane), in air conditioning units of passenger transport vehicles, in particular rail vehicles but also buses. Thus, for example, refrigerants are also known, the use of which is associated with a considerable risk of explosion or asphyxiation. Against this background, measures must be taken to respond to the occurrence of a leak in the refrigeration circuit in order to protect passengers.

SUMMARY OF THE INVENTION

Proceeding therefrom, it is the object of the invention to further develop the vehicle of the type mentioned at the beginning such that refrigerants that pose a risk to health are also able to be used in the refrigeration circuit.

This object is achieved in the vehicle mentioned at the beginning by the features of the independent claim.

The vehicle is thereby distinguished in that, within the air conditioning unit, a flow channel for the cooling air and a flow channel for the supply air are fluidically separated from one another by a common partition wall, the partition 8 wall has a closable degassing device which can be switched 9 between a closed state for normal operation of the air conditioning unit and an open state for emergency operation 11 of the air conditioning unit, in which the degassing device fluidically connects the flow channel for the cooling air and the flow channel for the supply air directly together, and, in the region of the vehicle to which the supply air is admitted, there is provided a detector for the refrigerant which is connected via signals to the degassing device such that, when it detects the refrigerant, it initiates actuation of the degassing device so that the degassing device assumes its open state.

Accordingly, during emergency operation of the air conditioning unit, a fluidic connection between the flow channel for the cooling air and the flow channel for the supply air is established by the control device that is provided. It should thereby be taken into account that the condenser fan for the cooling air typically has larger dimensions than the supply air fan, so that the cooling air volume flow rate is generally greater than the supply air volume flow rate. In this respect, the Bernoulli effect occurs in the region of the degassing device, which leads to the supply air located in the supply air channel, which in the event of a leak is loaded with refrigerant, being drawn in.

The condenser fan, which guides the cooling air past the condenser and then discharges it to the environment, thus also draws inflowing supply air into the cooling air flow channel via the open degassing device. As a result, the supply air loaded with refrigerant is thus discharged to the environment by means of the condenser fan.

This process of drawing in can be assisted by acting on the mode of operation of the supply air fan. If sufficient, the 8 supply air fan can simply be throttled. However, it is preferred that the detector is connected via signals to the supply air fan such that, when it detects the refrigerant, it initiates shutdown of the supply air fan.

It should thereby be taken into account that the processes of opening the degassing device and shutting down the supply air fan can take place close together in time or at the same time.

For implementing the fluidic connections between the detector on the one hand and the degassing device and the supply air fan on the other hand, different variants are conceivable. For example, the connection via signals can be implemented by hardwiring, so that detection of the refrigerant by the detector generates a signal, for example a binary signal, which opens the degassing device and shuts down the supply air fan indirectly or directly. Alternatively, it is also conceivable that an output signal of the detector, which is generated when the refrigerant is detected in the supply air, is fed to a vehicle controller, optionally a central vehicle controller, which in turn evaluates the incoming signal and converts it into actuation of the degassing device so that it assumes its open state, and shutdown of the supply air fan.

Advantageously, the detector is arranged downstream, based on the direction of flow of the supply air, of the evaporator of the refrigeration circuit. In particular, it can be located within the air conditioning unit. Alternatively, it is possible that the detector is in or on the path to the passenger compartment to which the supply air is admitted. In particular, the detector can be arranged directly behind an air distributor for the supply air, i.e. at the point at which the supply air is distributed from a main channel to downstream channel branches. In this manner, a leak in the refrigeration circuit can reliably be detected.

The degassing device is also arranged downstream, based on the direction of flow of the supply air, of the evaporator of the refrigeration circuit, in the partition wall. The 11 dimensioning of the degassing device in respect of a free opening cross-section can be carried out in a simple manner by the person skilled in the art.

The degassing device is preferably in the form of a degassing flap. The degassing flap can be either round or rectangular in shape.

Propane can preferably be used as the refrigerant. Further examples of refrigerants which can be used are those for which suitable detectors are available and which are flammable, for example butane, R600A, R-281, etc.

An exemplary embodiment of the invention will be explained in greater detail hereinbelow with reference to the drawing.

DETAILED DESCRIPTION OF THE INVENTION

Figure 1:
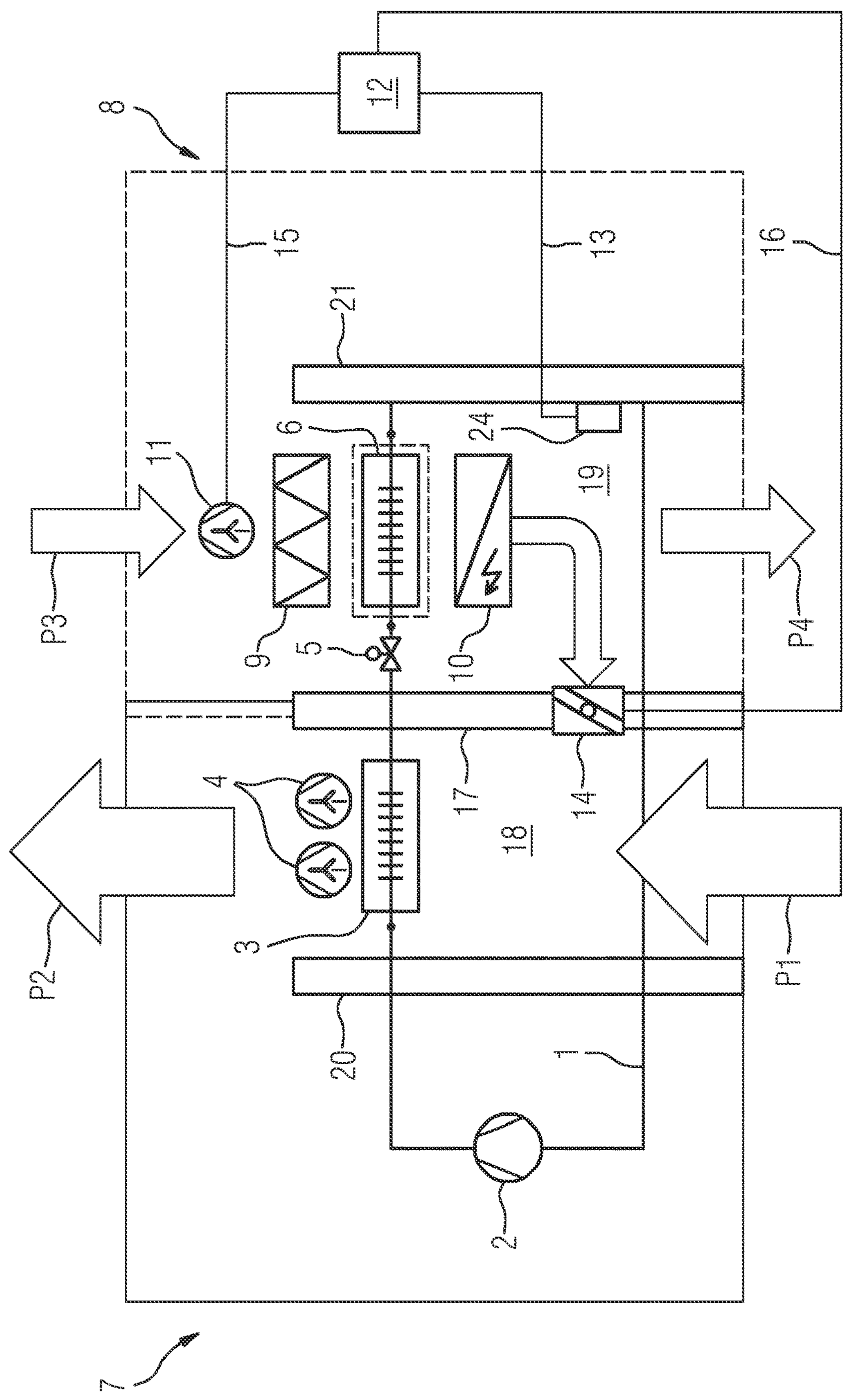
FIG. 1 is a schematic representation of an air conditioning unit for a rail vehicle.

As is apparent from FIG. 1, an air conditioning unit for use in a rail vehicle for passenger transport has a refrigeration circuit 1 with a compressor 2, a condenser 3 with an associated condenser fan 4, an expansion valve 5, and an evaporator 6. The air conditioning unit is thereby divided into a condenser part 7 and an air treatment part 8. In the condenser part 7, the condenser fan 4, which in the exemplary embodiment shown comprises two individual fans, draws in cooling air from the environment of the vehicle, which cooling air is guided past the condenser 3, warms it, and then leaves the air conditioning unit again in the direction towards the environment.

The air treatment part 8 comprises, in addition to the evaporator 6, also an air filter 9 and an after-heater 10. A supply air fan 11 conveys air to be conditioned through the air filter 9, along the evaporator 6 and through the after-heater 10, so that supply air with desired conditioning for a passenger compartment of the vehicle is present downstream of the after-heater 10.

In FIG. 1, an arrow P1 illustrates the volume flow rate of the cooling air drawn in by means of the condenser fan 4 (e.g. 14,000 cubic meters/hour) before it reaches the condenser, an arrow P2 illustrates the volume flow rate of the cooling air discharged to the environment, an arrow P3 illustrates air drawn in by the supply air fan (exhaust air optionally mixed with fresh air, e.g. about 3000 cubic meters/hour), and an arrow P4 illustrates the volume flow rate of the supply air introduced in the direction towards the passenger compartment via a suitable flow channel system.

In the present exemplary embodiment, the refrigeration circuit 1 is operated with propane, which involves increased health risks for people inside the passenger compartment in the event of a leak in the refrigeration circuit 1. For detecting a leak in the refrigeration circuit in particular in the region of the air treatment part 8, a detector 24 for propane is provided downstream, based on the supply air, of the evaporator 6. In the exemplary embodiment shown, this detector 24 is connected to a vehicle control device 12 via signals, namely via a signal line 13. The detector 24 signals to the control device 12 the detection of propane in the supply air provided for introduction into the passenger compartment. The control device 12 evaluates this signal and actuates both the supply air fan 6 and a degassing flap 14, namely via signal lines 15, 16.

In normal operation of the air conditioning unit, the degassing flap 14, which is likewise arranged downstream of the evaporator, is closed, while in emergency operation of the air conditioning unit, in which the detector 24 has detected a leak in the refrigeration circuit 1, it is opened.

In the open state, the degassing flap 14 creates a passage in a partition wall 17 which separates a flow channel 18 for the cooling air from a flow channel 19 for the supply air. The flow channels 18, 19 for the cooling air and the supply air are completed by further walls 20 (cooling air) and 21 (supply air). The partition wall 17 thus forms with the wall the flow channel 18 for the cooling air, while the wall 21 together with the partition wall 17 defines the flow channel 19 for the supply air and carries the detector 24.

In emergency operation of the air conditioning unit, the control device 12 controls the supply air fan 6 such that it is throttled sufficiently or is closed completely, while the degassing flap 14 is brought into its open position. In this respect, there is now a passage in the partition wall 17 for supply air, which is contaminated with refrigerant which has escaped due to the leak. In this operating state, the condenser fan 4, which can be operated at its maximum power in emergency operation, conveys not only the cooling air but also, by utilizing the Bernoulli effect, the supply air loaded with refrigerant from the flow channel 19. This supply air is guided past the condenser 3 and discharged to the environment by means of the condenser fan 4. In this respect, it is possible to empty the flow channel 19, and thus all the adjacent flow channels carrying supply air, by means of the condenser fan 4. In this manner, safe discharge of the supply air loaded with refrigerant to the environment is made possible, so that a risk to people inside the passenger compartment can effectively be reduced.

With regard to the supply of fresh air to the passenger compartment, it is possible to supply fresh air to the passenger compartment via a vehicle leak that is present due to the construction, for example doors, bellows, etc.

Figure 2:
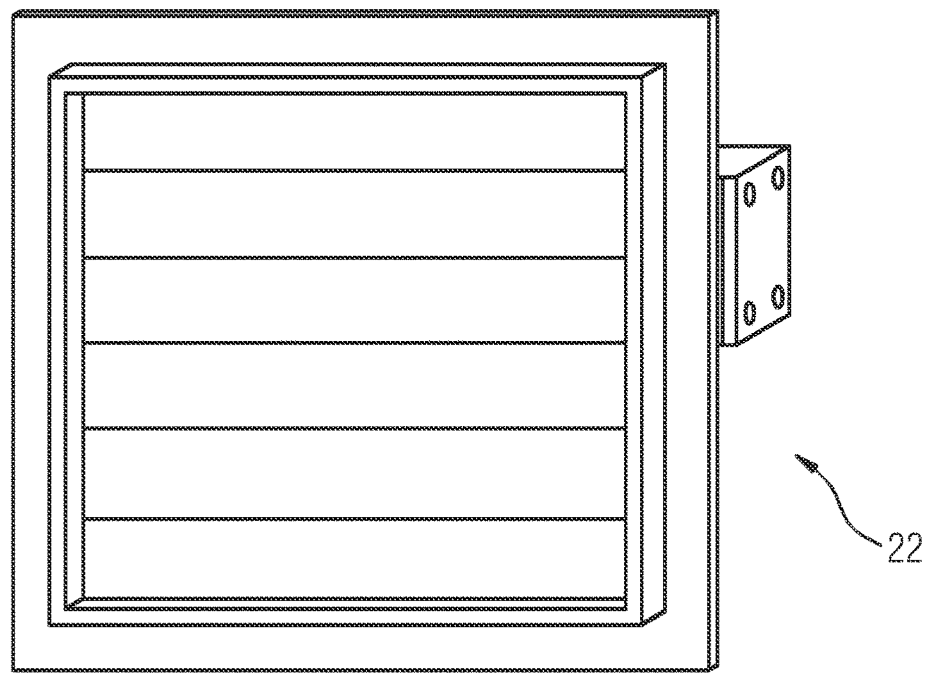
FIG. 2 is a perspective view of a first form of a degassing flap for use in the air conditioning unit of FIG. 1.
Figure 3:
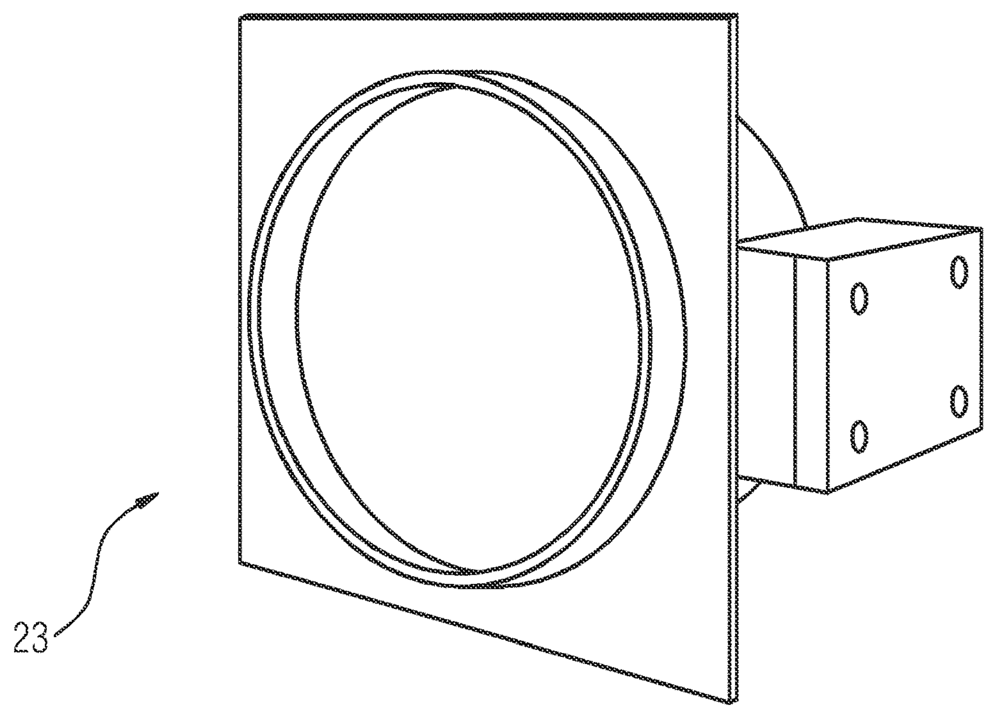
FIG. 3 is a perspective view of a second form of a degassing flap for use in the air conditioning unit of FIG. 1.

FIG. 2 shows an electronically controllable degassing flap 22 of square form, while FIG. 3 shows a degassing flap 23 of round form. It is common to both forms that they can be switched by means of the control device 12 between a closed position (normal operation of the air conditioning unit) and an open position (emergency operation of the air conditioning unit).

The invention claimed is:

1. A passenger transport vehicle, comprising:

a passenger compartment;

an air conditioner containing a refrigeration circuit operated using a refrigerant, said refrigeration circuit having a condenser with an associated condenser fan for conveying cooling air, and an evaporator, belonging to an air treatment part of said air conditioner, for controlling a temperature of supply air being conveyed by means of a supply air fan into said passenger compartment of the passenger transport vehicle, said air conditioner having a common partition wall and a flow channel for the cooling air and a flow channel for the supply air being fluidically separated from one another by said common partition wall, said common partition wall having a closable degassing device being switched between a closed state for normal operation of said air conditioner and an open state for emergency operation of said air conditioner, in which said closable degassing device fluidically connects said flow channel for the cooling air and said flow channel for the supply air directly together; and a detector of the refrigerant disposed in a region of the passenger transport vehicle to which the supply air is admitted, said detector connected via signals to said closable degassing device such that, when said detector detects the refrigerant, said detector initiates actuation of said closable degassing device so that said closable degassing device assumes the open state.

2. The vehicle according to claim 1, wherein said detector is connected via the signals to said supply air fan such that, when said detector detects the refrigerant, said detector initiates a shutdown of said supply air fan.

3. The vehicle according to claim 1, wherein said detector is disposed downstream, based on a direction of flow of the supply air, of said evaporator of said refrigeration circuit.

4. The vehicle according to claim 1, wherein said detector is disposed in said passenger compartment.

5. The vehicle according to claim 1, wherein said closable degassing device is disposed downstream, based on a direction of flow of the supply air, of said evaporator of said refrigeration circuit, in said common partition wall.

6. The vehicle according to claim 1, wherein said closable degassing device is a degassing flap.

7. The vehicle according to claim 1, wherein the refrigerant is propane.

8. The vehicle according to claim 1, further comprising a controller connected via the signals to said detector and/or to said supply air fan and said controller, on detection of the refrigerant by said detector, actuates said closable degassing device.

* * * * *